July 18, 1972
I. R. HIGGINS ET AL  
3,677,937
SPLIT LOOP CONTACTOR
Filed Feb. 10, 1970
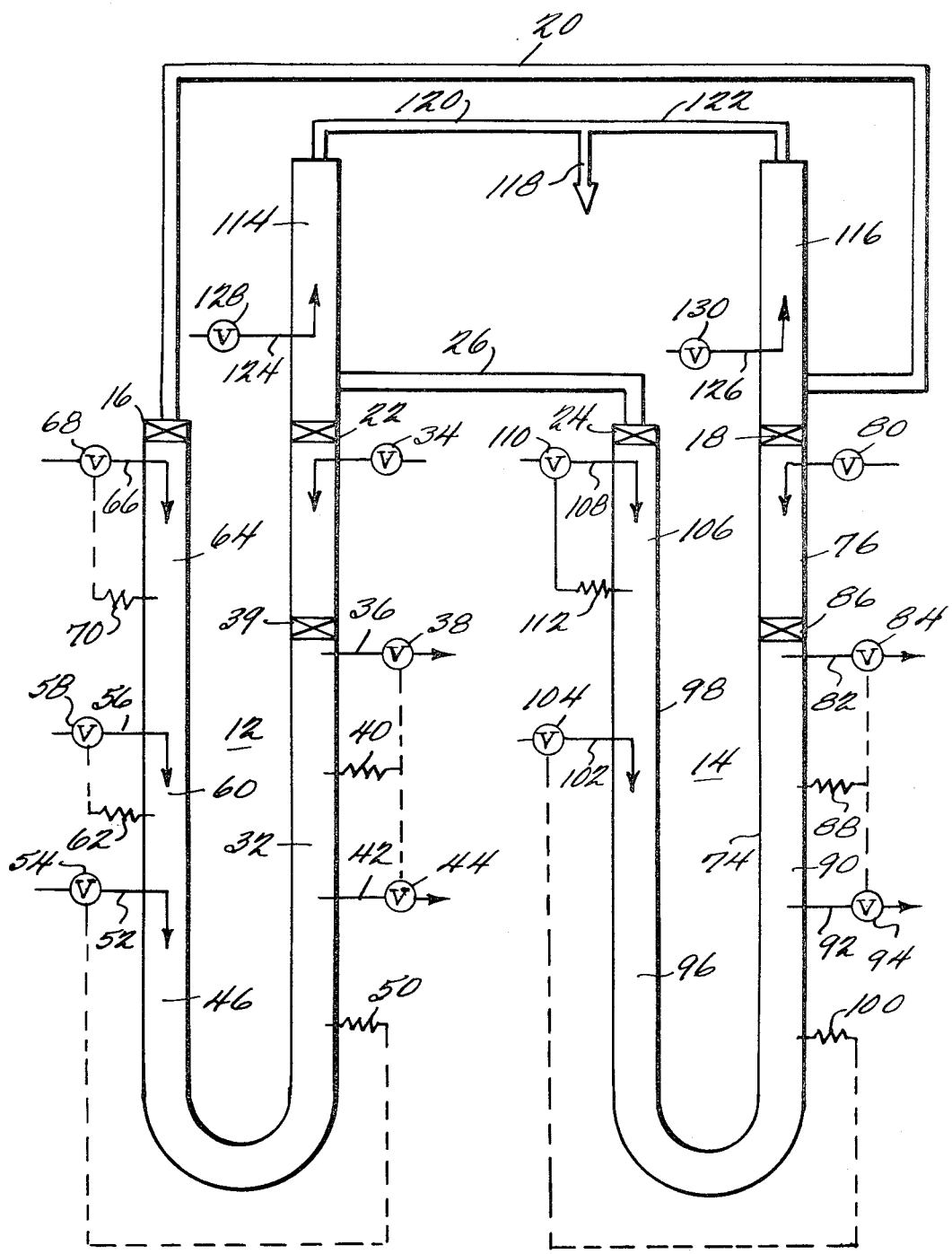
INVENTORS  
*IRWIN R. HIGGINS*  
*JACK M. FERNER*
BY  
*Cushman, Darby & Cushman*  
ATTORNEYS

United States Patent Office 3,677,937
Patented July 18, 1972

---

3,677,937
SPLIT LOOP CONTACTOR
Irwin R. Higgins and Jack D. Ferner, Oak Ridge, Tenn., assignors to Chemical Separations Corporation, Oak Ridge, Tenn.
Filed Feb. 10, 1970, Ser. No. 10,208
Int. Cl. B01d 15/02
U.S. Cl. 210—19                                      3 Claims

ABSTRACT OF THE DISCLOSURE

A continuous cyclic process for contacting ion exchange resin with two or more liquids in a plurality of serially connected U-shaped columns includes introducing a first liquid into a first U-shaped column loop whereupon a component thereof is absorbed on the ion exchange resin therein. A second liquid is introduced into a second column which contains a portion of the ion exchange resin previously contained in the first column loop serially connected therewith, said portion of the ion exchange resin having absorbed thereon the component from said first liquid. The second liquid has a first component exchangeable with the component from the first liquid on the ion exchange resin and a second component combinable with the component from the first liquid which is released from the ion exchange resin during the exchange. A product which is the combination of the second component of the second liquid and the released component of the first liquid is then removed from the second column loop.

---

This invention relates to a novel method and means for effecting substantially continuous countercurrent contact between liquid and particulate solids and, more particularly, to a method wherein two or more liquids of differing specific gravities and/or concentrations contact said particulate solids in a closed system with substantial elimination or reduction in dilution and intermixing or contamination of one liquid by the other, as well as a substantial increase in product recovery therefrom.

The present invention is advantageously employed in the treatment of such liquids as a solution containing potassium chloride and a solution containing phosphoric acid to produce potassium phosphate; or a spent pickle liquor to remove contaminants therefrom and to regenerate the same; or milk contaminated with radioactive material to remove the contaminating material; or to any liquid in general containing a contaminant or material wherein the removal or recovery of the contaminant or material is desired and the liquid is contacted with the particulate solids. During the course of treating the liquid one or more other liquids having a different concentration and/or specific gravity is also introduced into the closed system.

The particulate solids can be an ion exchange material such as a strong acid cation exchange resin, a weak acid cation exchange resin, a strong base anion exchange resin or a weak base anion exchange resin. Systems involving a combination of one or more of these ion exchange resins can also be utilized. Such ion exchange resins are commercially available and are sold under such trade names as Amberlite, Dowex, etc. Additionally, the particulate solids can be, for instance, activated carbon or the like when the liquid to be treated is water and it is desired to remove contaminants imparting an undesirable color or odor to the water or to remove certain undesirable organic materials therefrom. The particulate solids can also be alumina, for instance, when the liquid to be treated contains phosphates, the removal of which is desirable. It will thus be recognized that depending on the particular choice of solids used, as well as the nature of the contaminant to be removed or recovered from the liquid to be treated, the other liquid, differing from the liquid to be treated, can be, for instance, one such as a brine or other salts, an acid, a base, an alcohol or the like. It will thus be appreciated that the present invention has wide applicability and while the following discussion is concerned with the production of potassium phosphate from a solution containing potassium chloride, be it crude or refined, and a solution containing phosphoric acid, also either crude or refined, the discussion is not intended to limit the same.

Continuous countercurrent ion exchange systems have been employed which have been considered quite beneficial inasmuch as they eliminate many of the recognized disadvantages associated with batch or fixed-bed systems. Thus, continuous countercurrent ion exchange systems handle flow rates many times larger than those realized through fixed-bed systems and, at the same time, make it possible to regenerate ion exchange resins substantially stoichiometrically. Additionally, significant savings are realized through reduced processing or regenerating liquid usage, reduced resin inventory and smaller initial capital costs.

However, it has been found that in commercial size ion exchange equipment and especially equipment of the type which forms a closed system and which utilizes vessels and sections of relatively large diameter, intermixing or dilution of liquids to be treated with processing liquids is difficult to avoid. Further, it has been found that when the liquids to be treated or the processing liquids are characterized by a relatively high specific gravity, movement of such liquids with the resin through the closed system becomes difficult, often requiring the application of high pressures thereto, which, of course, seriously affects the economics of the operation.

It is, therefore, a principal object of the present invention to provide a method and apparatus for contacting particulate solids with two or more liquids of differing concentration and/or specific gravities which overcome the disadvantages of prior art developments.

Another object of the instant invention is to provide a novel apparatus and method for contacting a liquid with particulate solids wherein one or more other liquids are also passed through said apparatus whereby intermixing or dilution of said liquids is essentially eliminated and wherein movement of the liquids through the apparatus is significantly facilitated.

Other objects and advantages will be apparent from the following description taken in connection with the accompanying drawing which is a flow sheet schematically illustrating the ion exchange apparatus of this invention for producing potassium phosphate.

DESCRIPTION OF APPARATUS AND METHOD

The device shown diagrammatically in the drawing comprises a continuous solids-liquid contact apparatus 10 comprising a series of spaced, substantially U-shaped column loops 12 and 14. The solids outlet 16 of one of said U-shaped column loops, for instance, loop 12, is connected to the solids inlet 18 of the other of said U-shaped column loops, i.e., loop 14 through suitable solids transfer conduit means 20 while the solids inlet 22 of U-shaped column loop 12 is connected to the solids outlet 24 of U-shaped column loop 14 through solids transfer conduit means 26.

U-shaped column loop 12 is provided in one leg 28 thereof, with a particulate solids pulse section 30. Leading into pulse section 30, at the upper level thereof, is conduit means 32 controlled by valve means 34 for introducing particulate solids pulse medium. Adjacent the lower level of pulse section 30 there are provided resin valve 39 and conduit means 36, controlled by valve means 38 for removing particulate solids pulse medium from the U-shaped column loop 12. Boundary or interface control means 40 are provided to define or control the boundary between the pulse medium in particulate solids pulse section 30 and liquid product in product section 32. Leading from product section 32 is conduit means 42, controlled by valve means 44 for removing liquid product from U-shaped column loop 12. The opening and closing of valve means 38 and 44 are responsive to boundary or interface control means 40. Immediately adjacent product section 32 is reactant section 46 which, preferably, extends around the loop of the column 12 and terminates in the other leg 48 of the column loop 12. Boundary or interface control means 50 are provided to define or control the boundary between the liquid product in product section 32 and the liquid reactant section 46, which means can be the same as interface control means 40. Leading into reactant section 46 is conduit means 52, controlled by valve means 54 for introducing therein a liquid reactant. The opening and closing of valve means 54 are responsive to boundary or interface control means 50. When more than one liquid reactant is to be introduced into the reactant section 46, preferably separate conduit means 56, controlled by valve means 58 are provided, said additional conduit means being vertically spaced from the primary liquid reactant conduit means 52 to provide a secondary reactant section 60. The boundary between the liquid reactant in primary reactant section 46 and the liquid reactant in secondary reactant section 60 can be controlled by boundary or interface control means 62 to which is responsive the opening and closing of valve means 58 in secondary liquid reactant conduit 56. Adjacent the reactant section 60 and/or 46 is solids rinse section 64 which is provided with conduit means 66, controlled by valve means 68 for introducing, adjacent the upper level therein, a solids rinse medium. Boundary or interface control means 70 are provided to define or control the boundary between the liquid reactant in reactant sections 60 and/or 46 and the rinse medium in rinse section 64.

U-shaped column loop 14 is constructed in a fashion similar to U-shaped column loop 12. Thus, U-shaped column loop 14, in one leg 74, is provided with a particulate solids pulse section 76. Leading into pulse section 76, at the upper level thereof is conduiit means 78, controlled by valve means 80, for introducing particulate solids pulse medium. Adjacent the lower level of pulse section 76 there are provided resin valve 86 and conduit means 82 controlled by valve means 84 for removing particulate solids pulse medium from the U-shaped column loop 14. Boundary or interface control means 88 are provided to define or control the boundary between the pulse medium in particulate solids pulse section 76 and liquid product in product section 90. Leading from product section 90 is conduit means 92, controlled by valve means 94 for removing liquid product from U-shaped column loop 14. The opening and closing of valve means 84 and 94 are responsive to the boundaries or interface control means 88. Immediately adjacent the product section 90 is reactant section 96 which, preferably, extends around the loop of the column 14 and terminates in the other leg 98 of the column loop 14. Boundary or interface control means 100 are provided to define or control the boundary between the liquid product in product section 90 and the liquid reactant in reactant section 96, which means can be the same as interface means 88. Leading into reactant section 96 is conduit means 102, controlled by valve means 104 for introducing therein a liquid reactant. The opening or closing of valve means 104 are responsive to boundary or interface control means 100. Adjacent the reactant section 96 is solids rinse section 106 which is provided with conduit means 108, controlled by valve means 110 for introducing, adjacent the upper level therein, a solids rinse medium. Boundary or interface control means 112 are provided to define or control the boundary between the liquid reactant in reactant section 96 and the rinse medium in rinse section 106.

It has also been found convenient to provide each of U-shaped column loops 12 and 14 with a particulate solids reservoir section 114 and 116 respectively, each reservoir section being in communication with the pulse section of its associated U-shaped column loop through particulate solids valve 22 or 18. The inlets to said reservoir sections are also in communication with respective solids transfer conduits 20 and 26 and the reservoir sections 114 and 116 can lead to a common overflow recycle conduit 118 through overflow conduits 120 and 122, respectively. Further, reservoir sections 114 and 116 can be provided with conduits 124 and 126, controlled by valve means 128 and 130, respectively, for introducing a backwash medium therein.

The operation of the split loop contactor of this invention will now be described and for the sake of clarity, the cyclic operation will be defined in terms of five steps which comprise a cycle: (1) particulate solids pulse initiation; (2) particulate solids pulse termination; (3) process initiation; (4) liquid interface position adjustment; and (5) process termination.

During a particulate solids pulse initiation operation to move a portion of the particulate solids from U-shaped column loop 12 through particulate solids valve 16 to the particulate solids reservoir section 116 of U-shaped column loop 14 and to move a portion of the particulate solids from U-shaped column loop 14 through particulate solids valve 24 to the particulate solids reservoir section 114 of U-shaped column loop 12. The following table indicates the positioning of the valves in U-shaped column loops 12 and 14:

TABLE 1

| | | Unit | | | |
| --- | --- | --- | --- | --- | --- |
| | | 12 | | 14 | |
| | | Valve position | | Valve position | |
| Step | Time for operation | Open | Closed | Open | Closed |
| Particulate solids pulse initiation. | About 10 seconds. | 16, 39, 34 | 22, 58, 54, 44, 68, 38, 128 | 86, 24, 80 | 18, 104, 94, 110, 84, 130 |

With the valves positioned in accordance with the above scheme, particulate solids pulse medium is introduced into U-shaped columns 12 and 14 through conduits 34 and 78 respectively. During this pulsing operation a portion of the particulate solids, previously treated in U-shaped column loop 14 are transferred therefrom to particulate solids reservoir section 114 of U-shaped column loop 12 via open particulate solids valve 24 and particulate solids transfer conduit 26. Preferably, at the same time, a substantially equal portion of particulate solids treated in U-shaped column loop 12 is transferred therefrom to particulate solids reservoir 116 of U-shaped column loop 14 via open particulate solids valve 16 and particulate solids transfer conduit 20. The pulse operation generally lasts for about 10 seconds although it will be appreciated that the pulsing can be effected in shorter or longer periods, if desired.

It is important, however, to maintain a substantially constant amount of particulate solids within each U-shaped column loop and to this end, this invention also provides for the control of the pulsing operation by (1) providing a solids level controller system 132 and 134 in each of said U-shaped column loops 12 and 14 respectively. The solids level controller system can be, for instance, a pair of vertically spaced photocells, conductivity probes or sonic devices or any combination thereof which will detect the presence, i.e. the upper and lower solids level in pulse sections 30 and 76, respectively. Just before the initiation of the pulse operation, the upper solids level controller in pulse sections 30 and 76 sense that the upper solids level therein is sufficiently high so as to substantially fill the pulse sections 30 and 76 with solids. In response to this high level of solids sensed in these pulse sections, particulate solids valves 22 and 18 in U-shaped column loops 12 and 14, respectively, are closed.

The lower solids level controller, during pulsing senses a lower solids level and in response thereto closes the pulse medium valves 34 and 80, thus controlling the amount of solids which is pulsed through the split loop contactor.

Alternatively, the amount of particulate solids within each U-shaped clumn loop can be maintained constant by filling the column loop with sufficient solids so that at the end of the process cycle, solids valves 22 and 18 in the U-shaped column loops are always covered with particulate solids. This insures that the pulse sections 30 and 76 are always completely filled with particulate solids. In this embodiment a single solids level controller is provided in pulse sections 30 and 76 which in response thereto causes the resin valves 22 and 18 to close when a given amount of solids has been exhausted therefrom.

Another alternative method of controlling the time of the pulse operation is to utilize a conventional timing mechanism to control the opening and closing of pulse medium valves 34 and 80.

While the solids pulsing step in each U-shaped column loop 12 and 14, above, has been described as being conducted essentially simultaneously, it is obvious that this mode of operation is not absolutely necessary and that in fact the two pulsing operations can be out of phase or pulsing in one U-shaped column loop can occur more frequently than pulsing in the other U-shaped column loop.

At the termination of the solids pulsing operation, solids pulsing medium valves 34 and 80 in U-shaped column loops 12 and 14, respectively, are closed. The following table indicates the positioning of the valves in these loops:

TABLE 2

| Step | Time for operation | Unit 12 Valve position Open | Unit 12 Valve position Closed | Unit 14 Valve position Open | Unit 14 Valve position Closed |
|---|---|---|---|---|---|
| Termination of pulsing operation. | About 10 seconds. | 39, 16 | 34, 22, 58, 54, 44, 68, 38, 128 | 86, 24 | 80, 18, 104, 94, 110, 84, 130 |

The solids level in each of U-shaped column loops 12 and 14 was lowered to a point below and the lower solids level controller 132 and 134, in each of pulse sections 30 and 76, respectively, and it was the sensing of this lowered solids level which caused valves 34 and 80 to close, thus terminating the pulsing operation.

With the termination of the solids pulsing operation, the processing operation commences and the position of the valves in U-shaped column loops 12 and 14 at the commencement of the processing operation and for a period of time less than the total processing operation is tabulated below:

TABLE 3

| Step | Time of operation | Unit 12 Valve position Open | Unit 12 Valve position Closed | Unit 14 Valve position Open | Unit 14 Valve position Closed |
|---|---|---|---|---|---|
| Process initiation (Pulse water elimination and resin rinse). | About ½ the total processing operation, generally about 1-3 minutes. | 22, 58, 54, 68, 38, 128 | 39, 16, 34, 44 | 18, 104, 110, 84, 130 | 86, 24, 80, 94 |

During this initial phase of the processing operation with the valves positioned in accordance with the above scheme, particulate solids rinse medium through conduit 66 and liquid reactants through conduits 56 and 52 are introduced into the U-shaped column loop 12 while pulse medium through conduit 36 is eliminated therefrom. Valve 38 remains open, thus permitting elimination of pulse medium from U-shaped column loop 12 via conduit 36 until the liquid-liquid interface controller 40 detects the pulse medium-product interface at which time and in response thereto, valve 38 closes and valve 44 opens, thereby permitting the removal of product from U-shaped column loop 12 via conduit 42.

Further, during this initial phase of the processing step, the introduction of particulate solids rinse medium into U-shaped column loop 12, via conduit 66 continues until liquid-liquid interface controller 70 detects the rinse medium-reactant interface, at which time valve 68 is closed in response thereto.

During this initial phase of the process step particulate solids rinse medium through conduit 108 and liquid reactant through conduit 102 are introduced into U-shaped column loop 14 while pulse medium through conduit 82 is eliminated therefrom. Valve 84 remains open, thus permitting withdrawal of pulse medium from U-shaped column loop 14 until the liquid-liquid interface controller 88 detects the pulse medium-product interface at which time and in response thereto valve 84 is closed and 94 is opened thereby permitting the removal of product from U-shaped column loop 14 via conduit 92.

Additionally, during this initial phase of the process step, the introduction of particulate solids rinse medium into U-shaped column loop 14 via conduit 108 continues until liquid-liquid interface controller 112 detects the rinse medium-reactant interface, at which time valve 110 is closed in response thereto.

The initial phase of the process step has been described in terms of simultaneously introducing rinse medium and reactant into the U-shaped column loops 12 and 14. It will be observed, however, that this scheme can be modified by sequentially introducing these streams into the U-shaped column loop, although a simultaneous operation is preferred since it provides for an overall shorter operation and hence an increase in the productivity capability of the ion exchange contactor.

Additionally, the introduction of the rinse medium into the U-shaped column loops 12 and 14 serves an important function other than rinsing a portion of the particulate solids about to be transferred to the other column loop. This rinsing operation also serves to displace the liquid volumes in the packed solids bed, thereby shifting the various liquid-liquid interfaces to the most advantageous position within the column loop with the use of minimum process liquids and minimum dilution or product loss.

At the end of this initial phase of the process cycle, i.e. with the completion of the rinsing and the pulse medium elimination operations, the valves in U-shaped column loops 12 and 14 are in the position indicated in the following table:

TABLE 4

| Step | Time of operation | Unit | | | |
|---|---|---|---|---|---|
| | | 12 | | 14 | |
| | | Valve position | | Valve position | |
| | | Open | Closed | Open | Closed |
| Final phase of process step. | 1-2 minutes. | 22, 58, 54, 44, 128 | 39, 16, 68, 38, 34 | 18, 104, 94, 130 | 86, 24, 110, 80, 84 |

During this final phase of the process step, the liquid reactants are continued to be introduced into U-shaped column loops 12 and 14 through conduits 54 and 58 of U-shaped column loop 12 and through conduit 104 of U-shaped column loop 14. Product valves 44 and 94 of U-shaped column loops 12 and 14 have been opened in response to the detection by interface controllers 40 and 88, respectively, of the pulse medium-product interface which also, in response thereto, effected the closing of pulse medium elimination valves 38 and 84, respectively.

Additionally, throughout both the initial and final phases of the process step backwash medium is introduced through conduits 124 and 126 into reservoir sections 114 and 116 of U-shaped column loops 12 and 14, respectively. Any overflow of backwash medium or solids can be removed from the sections via conduits 120 and 122, respectively, and directed to waste or to any convenient collecting receptacle via conduit 118 for recovery and re-use if desired.

At the termination of the process cycle the valves in U-shaped column loops 12 and 14 are in the position indicated in the following table:

TABLE 5

| Step | Time of operation | Unit | | | |
|---|---|---|---|---|---|
| | | 12 | | 14 | |
| | | Valve position | | Valve position | |
| | | Open | Closed | Open | Closed |
| End of process step. | About 10 seconds to allow change of valve position. | 22, 44, 128 | 39, 16, 58, 54, 68, 34, 38 | 18, 94, 130 | 86, 24, 104, 110, 80, 84 |

During this brief termination period of the process cycle, the valves controlling the introduction of liquid reactants into U-shaped column loops are closed, although product valves are left open to remove product therefrom and backwash medium valves are open to permit continued introduction of backwash medium into reservoir sections 114 and 116. After a period of about 10 seconds to permit valve repositioning, U-shaped column loops 12 and 14 are then ready for a repetition of the total cycle beginning with the particulate solids pulse operation described above. The valves then will be in the position as set forth in Table 1.

As an important advantage of the present invention, processing liquids, such as pulse and rinse media, are generally always on top of the other liquids, i.e. the reactant liquids or the liquid products, which generally are characterized by having a specific gravity or concentration greater than the processing liquids. This arrangement together with the provision of interface controller means to detect the various liquid-liquid interface of materials present in the U-shaped column loops provides for substantial elimination or reduction of a dilution or intermixing of processing liquids with liquids to be treated.

DETAILED DESCRIPTION OF APPARATUS AND METHOD

When the apparatus and method described above are utilized, for instance, to produce dipotassium acid phosphate, the spaced, substantially U-shaped column loops 12 and 14 are filled with a weak base anion exchange resin. In operation with the resin pulse medium valve 34 of U-shaped column loop 12 having just been closed after a pulsing operation, resin rinse medium valve means 68, phosphoric acid solution valve means 58, lime solution valve means 54, and resin pulse medium removal valve means 38 are in an open position, the remaining valves being positioned as set forth in Table 3 above. Thus, the resin rinse medium, preferably water, is introduced into section 64 of U-shaped column loop 12 via conduit 66. Phosphoric acid solution is introduced into section 60 via conduit 56 and the lime solution is introduced into section 46 via conduit 52. The rinse medium contacts the anion exchange resin in section 64 which resin previously had been loaded with $HPO_4^=$ ions in section 60 and rinses the same preparatory to its transfer from U-shaped column loop 12 to U-shaped column loop 14 in a subsequent pulsing operation.

During the introduction of rinse medium to U-shaped column loop 12, a phosphoric acid solution is introduced into section 60 thereof for contact with resin previously hydroxylated in section 46. The hydrogen ion from the phosphoric acid neutralizes the hydroxide ions on the resin, thereby making available exchange sites on the resin for the absorption of the $HPO_4^=$ ions from the phosphoric acid solution.

Also during the introduction of both rinse medium and phosphoric acid solution to U-shaped column loop 12, a lime solution is introduced into section 46 thereof for contact with resin previously transferred from U-shaped column loop 14, which resin is loaded with chloride ions, whereby on said contact the chloride ions of the resin are exchanged for the hydroxide ions from the lime solution.

Additionally, during this initial phase of the process operation, the pulse medium removal valve means 38 in conduit 36 is open to remove pulse medium from the U-shaped column. However, when interface controller means 40 senses the pulse medium, preferably water, —$CaCl_2$ solution interface valve 38 closes. About the same time interface controller 70 senses rinse medium-phosphoric acid solution interface and in response thereto effects the closing of rinse medium valve means 68. The closing of rinse valve means 68 and pulse medium valve means 38 terminates the initial phase of the process operation and the valves in U-shaped column 12 are positioned as set forth in Table 4 above. Further, interface controller means 40 also effects the opening of $CaCl_2$ valve means 44 on sensing $CaCl_2$.

While the initial phase of the process step is being carried out in U-shaped column loop 12, the resin rinse medium valve means 110, the potassium chloride solution valve means 104, and the resin pulse medium removal valve means 80 in U-shaped column loop 14 are also open as outlined in Table 3 above. Thus the resin rinse medium, again preferably water, is introduced into section 106 of U-shaped column loop 14 via conduit 108 and potassium chloride solution is introduced into section 96 thereof via conduit 102. The rinse medium contacts the anion exchange resin in section 106, which resin previously had been loaded with chloride ions in section 96 and rinses the same preparatory to its transfer to U-shaped column 12 in a subsequent pulsing operation.

During the introduction of rinse medium to U-shaped column loop 14, a potassium chloride solution is introduced into section 96 thereof for contact with resin previously transferred from U-shaped column loop 12, which resin is loaded with $HPO_4^=$ ions whereby on said contact, the $HPO_4^=$ ions of the resin are exchanged for the chloride ions of the potassium chloride solution.

Additionally, during this operation, the pulse medium removal valve means 84 in conduit 82 is opened to remove pulse medium from U-shaped column 14. However, when interface controller means 88 senses the pulse medium, preferably water, —$K_2HPO_4$ solution interface, valve 84 is closed in response thereto. Further, at about the same time, interface controller 112 senses the rinse medium-potassium chloride interface and in response thereto effects the closing of rinse medium valve means 110. The closing of rinse valve means 110 and pulse medium valve means 84 terminates the initial phase of the process operation in U-shaped column loop 14 and the valves in this column are positioned in accordance with the scheme set forth in Table 4 above. Further, interface controller means 88 also effects the opening of $K_2HPO_4$ solution valve means 94 on sensing $K_2HPO_4$.

During the final phase of the process operation, in U-shaped column 12, the introduction of phosphoric acid solution through conduit 56, the introduction of lime solution through conduit 52 and the removal of $CaCl_2$ solution through conduit 44 is continued until interface controller 62 senses the phosphoric acid solution-lime solution interface, at which time and in response thereto phosphoric acid valve means 58 is closed. Further, when the lime solution approaches the interface controller means 50, the latter detects or senses the interface between the lime solution and the product, a calcium chloride solution and on sensing this interface, the boundary or interface controller means 50, in response thereto, causes or effects the closing of lime solution valve means 54.

During the final phase of the process operation, in U-shaped column 14, the introduction of potassium chloride solution through conduit 102 and the withdrawal of dipotassium acid phosphate solution through conduit 94 is continued until the potassium chloride solution approaches the interface controller means 100 which detects or senses the interface between the potassium chloride solution and the product, a dipotassium acid phosphate solution and on sensing this interface, the boundary or interface controller means 100, in response thereto, causes or effects the closing of potassium chloride solution valve means 104.

On cessation of the introduction of phosphoric acid solution, lime solution and potassium chloride solution to the U-shaped column loops 12 and 14, the process operation is essentially terminated and the valve positions in the column loops are as indicated in Table 5 above. After a period of about 10 seconds product valves 44 and 94 close in response to the sensing of the solids pulse medium-product interface detected by interface controllers 40 and 88 and the remaining valves are positioned as indicated in Table 1 above to signal the commencement of the solids pulsing operation. As indicated hereinbefore the solids in both U-shaped column loops are, preferably, pulsed substantially simultaneously, although it is within the scope of this invention that the pulsing operating in one U-shaped column can be out of phase with the pulsing operation in the other U-shaped column loop.

In the preferred embodiment, however, the ion exchange resin in both U-shaped column loops is pulsed around its respective U-shaped column loop by the opening of, in U-shaped column loop 12, resin valves 16 and 39 and resin pulse medium valve 34 in conduit 32 and in U-shaped column loop 14, resin valves 24 and 86 and resin pulse medium valve 80 in conduit 78. During the pulsing operation, because of the higher pressure occasioned by the introduction of the pulse medium at the upper ends of legs 28 and 74 of U-shaped column loops 12 and 14, respectively, a portion of the resin previously rinsed in the upper portion of leg 98 of U-shaped column loop 14 will be transferred therefrom to the reservoir section 114 of U-shaped column loop 12 via open resin valve 24, and resin transfer conduit 26. At essentially the same time, a substantially equal portion of resin previously rinsed in the upper portion of leg 48 of U-shaped column loop 12 will be transferred therefrom to reservoir section 116 of U-shaped column loop 14 via open resin valve 16 and resin transfer conduit 20. Within each U-shaped column loop there is also, during the pulsing operation, movement of a portion of resin, substantially equal to the amount transferred between the column loops, from one section to the immediately adjacent section therein and a displacement of the position of the liquids in the various sections of the column loops substantially equal to the volume of pulse medium introduced. However, subsequent to the pulsing operation and on introduction of the rinse medium and the various liquid reactants to said U-shaped column loops, the liquids in each section essentially return to their pre-pulsing operation position. The pulsing operation can be controlled by use of solids level control means 132 and 134 in U-shaped columns 12 and 14, respectively. Thus when the resin reaches the upper resin level indicator, valve 22 in U-shaped column 12 is caused to be closed and when during pulsing the resin reaches the lower resin level indicator, valve 34 closes, thus terminating the pulsing operation in U-shaped column loop 12, a similar pulse control is effected in U-shaped column loop 14 by means of resin level controller 134. At the end of the pulsing operation the valves in U-shaped column loops 12 and 14 are in the position indicated in Table 2 and thereafter the process operation as described above can be repeated.

By spacing the U-shaped loop sections and by providing individual hydraulic pulsing means in each section, the resin in each section can be more efficiently moved about each section and the amount of pulse medium and the pressures formerly required to accomplish resin movement are significantly reduced by the present invention.

As indicated above, the lime solution can be replaced with any other suitable base material such as $NH_4OH$. The hydroxide of the $NH_4OH$ solution is exchanged for the chloride of the anion resin in U-shaped loop section 12 with the removal of $NH_4Cl$ from section 12 via conduit 42. Thereafter, the $NH_4Cl$ can be introduced into a tank (not shown) together with lime. The mixture can be agitated and the heat of reaction vaporizes ammonia which can be led off to a scrubbing tower for countercurrent contact with water to produce $NH_4OH$ which, in turn, can be recycled to U-shaped loop section 12 for introduction therein through conduit 52.

Conveniently the boundary or interface control means 40, 50, 62, 70, 88, 100 and 112 are dependent on the liquid-liquid interfaces to be controlled and can conveniently be controlled by conductivity controllers, ion specific electrode controllers, density detector controllers, photocell controllers and refractometer controllers.

DISCUSSION OF SPECIFIC EMBODIMENTS OF THE INVENTION

As a specific embodiment of the invention and with reference to the drawing, this system can be conveniently operated by processing in the spaced, connected U-shaped loop sections which are filled with weak base anion exchange resins such as is sold under the trade name of Amberlite IRA–68, 1800 gallons per day per ft.$^2$ of 4 M potassium chloride containing solution and a phosphoric acid solution containing 12,000 moles $H_3PO_4$ to produce 1800 gallons per day of 2 M $K_2HPO_4$. The resin can have a size ranging from 16 to 100 mesh and preferably between 16 and 50 mesh. The U-shaped loop sections can be up to 6 feet in diameter.

The resin can be moved in each U-shaped loop section at a rate of about ⅙ to ½ cu. ft. per minute per ft.$^2$ and the pulsing cycle in each section can last for about 10 to 30 seconds. The pulse medium which is preferably raw water is introduced into conduits 32 and 78 at a rate up to 10 gallons per minute per ft.$^2$ while the flow of resin rinse water into resin rinse conduits ranges between 1 and 4 gallons per minute per ft.$^2$ average.

The present invention is also, as indicated above, suitable for removing color and/or odor producing materials from water where the particulate solids chosen are activated carbon or for removing phosphates from liquids where the particulate solids chosen are alumina.

It will be understood from the foregoing description that this invention is not limited to practice according to the specific embodiment illustrated and described herein, and that variations of the liquids contacting the particulate solids and of processing liquids such as pulse and rinse media can be made while not departing from the principles involved. This invention, is therefore, to be understood to be limited only by the spirit and scope of the following claims.

What is claimed is:

1. A continuous cyclic process for contacting ion exchange resin with two or more reactant liquids in a plurality of U-shaped column loops connected in series wherein one liquid reactant introduced into one of said U-shaped column loops has a component which is absorbed on the ion exchange resin contained therein and wherein another reactant liquid introduced into another of said U-shaped column loops containing at least a portion of said ion exchange resin from said one U-shaped column loop having absorbed thereon said component from said one reactant liquid, has a first component which is exchanged for said component of said one reactant liquid on said ion exchange resin and a second component which is combined with said component of said one reactant liquid released from said ion exchange resin by exchange with said first component of said another reactant liquid thereby producing a product liquid which is withdrawn from said another U-shaped column loop; each of said U-shaped column loops having closable ion exchange resin inlet and outlet means adjacent the upper portions of the legs of the U-shaped column loops, the ion exchange resin outlet means of one of said U-shaped column loops being in communication with the ion exchange resin inlet of another of said U-shaped column loops through ion exchange resin transfer means to form a closed system, said ion exchange resin in each U-shaped column loop being shiftable around the respective U-shaped column loop from one section to a contiguous section therein and being shiftable from one U-shaped column loop to said another U-shaped column loop connected in series thereto, which process comprises:

(a) opening the ion exchange resin outlet and closing the ion exchange resin inlet of said U-shaped column loops;
   (b) introducing a liquid pulse medium having a specific gravity or concentration less than said reactant or product liquids into a first section of each of said U-shaped column loops adjacent the ion exchange resin inlet means thereof to hydraulically shift said ion exchange resin in said U-shaped column loops around said U-shaped column loops toward the ion exchange resin outlet means thereof a selected distance so that ion exchange resin is shifted from one section to a contiguous section therein and so that an amount of ion exchange resin from the ion exchange resin outlet means of one of said U-shaped column loops substantially equal to the amount of ion exchange resin introduced to said one U-shaped column loop from another said U-shaped column loop is displaced from said one U-shaped column loop and is introduced to another U-shaped column loop connected in series therewith, the introduction of said liquid pulse medium into said first section of each of said U-shaped column loops continuing for a time until the ion exchange resin therein reaches a predetermined sensed low level and in response to said sensed low level discontinuing the introduction of liquid pulse medium therein,
   (c) opening the ion exchange resin inlet and closing the ion exchange resin outlet of said U-shaped column loops;
   (d) introducing into a second section of one of said U-shaped column loops one reactant liquid containing a component to be absorbed on said ion exchange resin and causing said reactant liquid to flow through said ion exchange resin to transfer said component onto said ion exchange resin;
   (e) introducing into a second section of another of said U-shaped column loops containing at least a portion of ion exchange resin from said one U-shaped column loop having absorbed thereon said component from said one reactant liquid, another reactant liquid having a first component exchangeable for said component of said one reactant liquid on said ion exchange resin and a second component combinable with said component of said one reactant liquid released from said ion exchange resin by contact with said another reactant liquid and causing said another reactant liquid to flow through said ion exchange resin to exchange said first component thereof for said component of said one reactant liquid on said ion exchange resin;
   (f) withdrawing from a third section of said one U-shaped column loop a liquid with substantially reduced amounts of said component of said one reactant liquid, said third section being contiguous to said second section;
   (g) withdrawing from a third section of said another U-shaped column loop a product liquid comprising said second component of said another reactant liquid and said component of said one reactant liquid, said third section being contiguous to said second section of said another U-shaped column loop;
   (h) sensing the position of liquids in each of said sections and in response thereto discontinuing the introduction and withdrawal of said liquids; and
   (i) repeating steps (a) to (f) as long as desired.

2. The continuous cyclic process of claim 1 which includes introducing ion exchange resin rinse medium into a fourth section of each of said U-shaped column loops adjacent the ion exchange resin outlet means thereof substantially simultaneously with steps (d) and (e) above to contact ion exchange resin having adsorbed thereon a component from each of said reactant liquids and sensing the position of said rinse medium in said U-shaped column loops and in response thereto discontinuing the introduction of rinse medium.

3. The continuous cyclic process of claim 1 which includes withdrawing from said first section in each of said U-shaped column loops liquid pulse medium.

References Cited

UNITED STATES PATENTS

| | | | |
|---|---|---|---|
| 3,325,011 | 6/1967 | Keller | 210—189 X |
| 3,415,377 | 12/1968 | Higgins | 210—268 X |
| 2,801,966 | 8/1957 | Mertes et al. | 210—33 |
| 3,193,498 | 7/1965 | Platzer et al. | 210—33 |
| 3,137,651 | 6/1964 | De Lara et al. | 210—33 |

REUBEN FRIEDMAN, Primary Examiner

T. G. WYSE, Assistant Examiner

U.S. Cl. X.R.

210—33, 189